(12) United States Patent
Mayer (10) Patent No.: US 10,358,786 B2
(45) Date of Patent: Jul. 23, 2019

(54) FOUNDATION ANCHORING FOR A WORKING MACHINE

(71) Applicant: Liebherr-Werk Biberach GmbH, Biberach an der Riß (DE)

(72) Inventor: Joachim Mayer, Biberach (DE)

(73) Assignee: Liebherr-Werk Biberach GmbH, Biberach an der Riß (DE)

( * ) Notice: Subject to any disclaimer, the term of this patent is extended or adjusted under 35 U.S.C. 154(b) by 0 days.

(21) Appl. No.: 15/565,926

(22) PCT Filed: Apr. 7, 2016

(86) PCT No.: PCT/EP2016/000574
§ 371 (c)(1),
(2) Date: Oct. 12, 2017

(87) PCT Pub. No.: WO2016/165816
PCT Pub. Date: Oct. 20, 2016

(65) Prior Publication Data
US 2018/0106009 A1    Apr. 19, 2018

(30) Foreign Application Priority Data
Apr. 14, 2015   (DE) .......................... 10 2015 004 828

(51) Int. Cl.
*B23Q 1/00*    (2006.01)
*E02D 27/42*   (2006.01)
(Continued)

(52) U.S. Cl.
CPC ............. *E02D 27/42* (2013.01); *E02D 27/44* (2013.01); *E02D 27/50* (2013.01); *F16M 7/00* (2013.01)

(58) Field of Classification Search
CPC ......... E02D 27/42; E02D 27/44; E02D 27/50; F16M 7/00
See application file for complete search history.

(56) References Cited

U.S. PATENT DOCUMENTS 3,715,851 A * 2/1973 Bennett .................. F16B 35/00
                                                          248/463
3,767,148 A * 10/1973 Crowdy ................. F16F 1/376
                                                          248/680

(Continued)

FOREIGN PATENT DOCUMENTS

AT          295 250 B       12/1971
DE        100 09 072 A1       8/2001
(Continued)

*Primary Examiner* — Gisele D Ford
(74) *Attorney, Agent, or Firm* — Dilworth & Barrese, LLP (57) ABSTRACT

The present invention relates to an apparatus for anchoring a work machine to a foundation that comprises a mounting plate (1) for placing onto a foundation (6), a counter-plate (2) for casting in the foundation (6), a hollow pipe (3) that connects the mounting plate (1) to the counter-plate (2) and is accessible toward its inner side from the side of the mounting plate (1) remote from the counter-plate (2), and a tensile element (4) for introducing into the hollow pipe (3), with the tensile element (4) being releasably anchorable to the counter-plate (2) by a rotational movement. The apparatus is characterized in that it comprises an element providing security against rotation (5) that is connected to an outer contour of the tensile element (4) and arranges it in a rotationally fixed manner. An unintentional release of the tensile element (4 from an anchoring means connected to the counter-plate (2) is suppressed by this apparatus.

20 Claims, 7 Drawing Sheets

(51) Int. Cl.
*E02D 27/44* (2006.01)
*E02D 27/50* (2006.01)
*F16M 7/00* (2006.01)

(56) References Cited

U.S. PATENT DOCUMENTS

| | | | | |
|---|---|---|---|---|
| 3,774,352 A | * | 11/1973 | Weber | B23Q 3/108 |
| | | | | 254/104 |
| 3,849,857 A | * | 11/1974 | Murray, Jr. | F16M 7/00 |
| | | | | 248/346.06 |
| 3,878,708 A | * | 4/1975 | Kralowetz | B21J 9/00 |
| | | | | 72/407 |
| 4,133,508 A | * | 1/1979 | Sloyan | H02K 5/26 |
| | | | | 248/558 |
| 4,915,334 A | * | 4/1990 | White | A47B 91/024 |
| | | | | 248/188.4 |
| 5,016,338 A | * | 5/1991 | Rowan, Jr. | B23Q 1/0054 |
| | | | | 264/261 |
| 5,110,082 A | * | 5/1992 | Rowan, Jr. | F16M 7/00 |
| | | | | 248/649 |
| 5,505,033 A | * | 4/1996 | Matsuo | E02D 27/42 |
| | | | | 52/169.9 |
| 5,533,835 A | * | 7/1996 | Angelette | E02D 27/42 |
| | | | | 405/229 |
| 5,586,417 A | * | 12/1996 | Henderson | E02D 27/42 |
| | | | | 405/233 |
| 5,855,443 A | * | 1/1999 | Faller | E01F 9/635 |
| | | | | 248/548 |
| 5,904,008 A | * | 5/1999 | Frank | E04H 13/003 |
| | | | | 403/322.3 |
| 6,038,823 A | * | 3/2000 | Gallimore | E01F 1/005 |
| | | | | 52/126.1 |
| 6,722,821 B1 | * | 4/2004 | Perko | E02D 5/801 |
| | | | | 405/249 |
| 2003/0115810 A1 | * | 6/2003 | Reinert, Sr. | E02D 5/803 |
| | | | | 52/156 |
| 2007/0065234 A1 | * | 3/2007 | Jakubowski | E02D 27/42 |
| | | | | 405/244 |
| 2009/0279959 A1 | * | 11/2009 | Bakos | E02D 27/42 |
| | | | | 405/231 |
| 2009/0282774 A1 | * | 11/2009 | Jensen | E02D 27/42 |
| | | | | 52/698 |
| 2011/0222957 A1 | * | 9/2011 | Marques Lito Velez Grilo | E02D 27/42 |
| | | | | 403/4 |
| 2014/0166845 A1 | * | 6/2014 | Hooghart | F16M 7/00 |
| | | | | 248/670 |
| 2014/0318033 A1 | * | 10/2014 | Coordes | E02D 27/42 |
| | | | | 52/40 |
| 2015/0191929 A1 | * | 7/2015 | Takahashi | E02D 27/42 |
| | | | | 52/295 |
| 2015/0259914 A1 | * | 9/2015 | Tanaka | E04C 3/32 |
| | | | | 52/854 |
| 2015/0259915 A1 | * | 9/2015 | Tanaka | E04C 3/32 |
| | | | | 52/298 |
| 2016/0047137 A1 | * | 2/2016 | Aagerup | E02D 27/12 |
| | | | | 248/530 |
| 2016/0222662 A1 | * | 8/2016 | Tanaka | E04B 1/2403 |
| 2016/0237681 A1 | * | 8/2016 | Tanaka | E04H 9/021 |

FOREIGN PATENT DOCUMENTS

| | | |
|---|---|---|
| DE | 100 25 636 A1 | 12/2001 |
| DE | 10 2011 102 985 A1 | 11/2012 |
| EP | 2481853 * | 1/2012 |
| EP | 2 481 853 A1 | 8/2012 |
| WO | 2013/040640 A1 | 3/2013 |

* cited by examiner

FOUNDATION ANCHORING FOR A WORKING MACHINE

BACKGROUND OF THE INVENTION

The present invention relates to an apparatus for anchoring a work machine at a foundation as well as to a method of anchoring a work machine at a foundation and to a method of dismantling an anchorage of a work machine to a foundation.

The stability for the proper operation of a work machine typically depends on the extent of the engaging forces, for example compressive forces, tensile forces or also torsional forces, and on the anchorage of the work machine carried out at the ground side. An ideal introduction of the forces that occur into the site of the work machine increases the stability of and consequently the possible load on the machine.

The anchorage of a crane tower in an on-site concrete foundation e.g. has to lead the forces that occur from the crane tower into the foundation. The introduction of the compressive forces typically takes place via corresponding pressure contact areas. The applied tensile forces either likewise have to be introduced into the foundation via these contact areas, but in a reverse direction, or via additional tensile elements.

The most varied solutions are already known for the possible anchorage of known revolving tower cranes in a concrete foundation produced on site. The use of anchoring feet is, for example, known, typically called foundation anchors, that are positioned and aligned before the concreting of the foundation and are firmly cast after the manufacture of a concrete reinforcement.

The prior art discloses various solutions to achieve a reusability of the anchoring feet that is as high as possible. These solutions typically include anchoring elements that are connected to the work machine, in particular to the tower of a crane, and are then connected to the foundation on site in a manner ensuring tensile strength. Anchor screws, threaded bars with counter-plates or similar components are typically preferred for this purpose.

There is, however, the risk in this process that a connection of the tensile element to the foundation or to an element to be cast in the foundation is released in an unwanted manner during the installation of the conventional anchorage of a work machine, during the manufacture of the foundation surrounding a part of the anchorage and/or during the preloading process of the anchorage. This has the consequence that the security of the anchorage is no longer ensured and a safe operation of the work machine held by the anchorage is not possible.

EP 2 481 853 A1, for example, discloses a foundation anchorage for a work machine that is, however, prone to the problem described above.

Other attempts to avoid the above problem proposed in the prior art typically propose the use of threaded bars to which the work machine can be fastened, but with the threaded bars being cast in the foundation, firmly connected to the foundation in so doing, and no longer being able to be separated from the foundation on a dismantling of the work machine. In this respect, an unintentional release on the preloading of the anchoring feet is practically precluded, but the costs for the lost components are high.

SUMMARY OF THE INVENTION

The object of the present invention is now to provide an anchorage apparatus that cannot release in an unintended manner from the force fit with a foundation or with an element to be cast in the foundation during the assembly, during the manufacture of the foundation and/or during the preloading process. At the same time, however, the quantity of reusable materials should be as high as possible to keep the costs for an anchorage of the work machine low.

Said object is satisfied by the apparatus for anchoring a work machine to a foundation having the features herein.

The apparatus for anchoring a work machine to a foundation accordingly comprises a mounting plate for placing onto a foundation, a counter-plate for casting in the foundation, a hollow pipe that connects the mounting plate to the counter-plate and is accessible toward its inner side from the side of the mounting plate remote from the counter-plate, and a tensile element for introducing into the hollow pipe, with the tensile element being releasably anchorable to the counter-plate by a rotational movement. The apparatus is furthermore characterized in that it comprises an element providing security against rotation that is connected to an outer contour of the tensile element and arranges it in a rotationally fixed manner.

A liquid concrete forming the foundation is typically cast around the standing anchorage apparatus to anchor the apparatus. The mounting plate lies on the surface of the foundation after a hardening procedure of the concrete foundation. An anchoring foot to which the work machine can be fastened extends, preferably in one piece, from the mounting plate. It is, however, also conceivable that the mounting plate is only placed on after a hardening procedure of the foundation and is joined together with the further elements of the anchorage apparatus.

The counter plate for casting in the foundation is preferably arranged approximately in parallel with the mounting plate or in parallel with the foundation surface, but has a certain spacing from the mounting plate. On the casting of the concrete foundation, the counter-plate is typically cast in the foundation to later be able to particularly effectively conduct tensile forces into the foundation.

The hollow piece connecting the mounting plate and the counter-plate to one another can preferably have a circular cross-section. The hollow pipe is furthermore accessible toward its interior from the side of the mounting plate that is remote from the foundation or from the counter-plate to be cast in the foundation. The hollow pipe surrounds the tensile element that has a section that projects out of the hollow pipe in the direction toward the side of the mounting plate remote from the counter-plate in a state of the tensile element anchored to the counter-plate. The length of the hollow pipe is accordingly preferably smaller than the length of the tensile element.

The tensile element can be introduced into the hollow pipe and can be releasably anchored to the counter-plate with the help of a rotational movement. It is, for example, conceivable that the tensile element has a thread at its end close to the counter-plate, said thread engaging with a thread in the counter-plate or with an anchoring means for anchoring the counter-plate to the tensile element. The tensile element is preferably a bar that is releasably anchorable to the counter-plate by a rotational movement of the tensile element around its longitudinal axis. It is therefore possible in this context to release a tensile element anchored to the counter-plate from the state anchored to the counter-plate or to an anchoring element by a rotational movement about its longitudinal axis and to remove it from the hollow pipe. The element providing security against rotation that is connected to an outer contour of the tensile element and that arranges it in a rotationally fixed manner is connected to the tensile element such that a rotation of the tensile element is precluded that could result in a release from the anchorage to the counter-plate. The element providing security against rotation can be designed in this respect such that it completely surrounds the tensile element. It is additionally preferably possible that the element providing security against rotation is provided at that side of the mounting plate that is remote from the counter-plate.

This apparatus has the advantage that it is not possible to release the anchorage of the tensile element to the counter-plate in an unwanted manner during the assembly of the anchorage, during the manufacture of the foundation and/or during the preloading procedure of the anchorage apparatus. It is nevertheless possible to release the tensile element from the state anchored to the counter-plate and to reuse it, whereby the total costs of the anchorage apparatus are reduced. The element providing security against rotation prevents the release of the anchoring connection and thus ensures the load-bearing capacity of the tensile element. An interconnection of the tensile element to the concrete foundation is therefore not necessary.

The element providing security against rotation can in this respect be arranged at the side of the mounting plate remote from the counter-plate. This feature has the effect that the element providing security against rotation is not cast through the foundation, but is rather located above the mounting plate to be placed onto the foundation. It is therefore possible to reuse the element providing security against rotation in further anchorage apparatus. A further advantage is that with a preloading procedure that is typically carried out by applying a torque to the tensile element, moments introduced into the tensile element from above are led off directly above (at the side of the mounting plate remote from the counter-plate) by the element providing security against rotation. The tensile element is thus protected from torsional forces that act over the total length of the tensile element. It is thereby possible to make the tensile element narrower and to save material.

The element providing security against rotation preferably comprises a passage hole whose inner cross-section corresponds to an outer cross-section of the tensile element. It is thereby possible to plug the element providing security against rotation onto the section of the tensile element that extends out of the mounting plate in the direction of the side of the mounting plate remote from the counter-plate. The tensile element is simply pushed through the passage hole of the element providing security against rotation in this process and is placed onto the mounting plate.

In accordance with a further optional feature of the invention, the inner cross-section of the passage hole corresponds in one section to a round hole, to a three-angled form, to a four-angled form, to a five-angled form, to a six-angled form, to a seven-angled form, to an eight-angled form, to a nine-angled form, to a ten-angled form, to an eleven-angled form or to a twelve-angled form.

The apparatus furthermore preferably comprises a locking means that is arranged at a fixed position at the side of the mounting plate remote from the counter-plate for a rotationally rigid fixing of the element providing security against rotation. An element providing security against rotation that is rotationally rigidly connected to the tensile element is locked by the locking means such that a rotation of the element providing security against rotation is no longer possible. One or more abutment rails are preferably used as locking means for this purpose. These abutment rails are arranged in a fixed position on the mounting plate and cooperate with the element providing security against rotation such that a rotation of the tensile element about its longitudinal axis is suppressed. A different means than an abutment rail is, however, also conceivable as a locking means. A locking point is thus conceivable, for example, that is arranged on the mounting plate such that it does not permit any rotation of the element providing security against rotation that is operatively connected to the tensile element.

It is furthermore advantageous for the tensile element to have a thread at the end close to the counter-plate, said thread being screwable to the counter-plate itself and/or to an anchoring means that is arranged at the side of the counter-plate remote from the mounting plate.

So that the tensile element can cooperate with an anchoring element that is arranged at the side of the counter-plate remote from the mounting plate, a cut-out of the counter-plate is necessary through which the tensile element passes and with an anchoring element connectable to the tensile element being arranged at the side of the counter-plate remote from the mounting plate. The anchoring element is preferably so large in a specific alignment with respect to the counter-plate that it can no longer pass through the cut-out of the counter-plate. In addition, it should also be connectable in this position by a rotational movement to the tensile element penetrating through the cut-out of the counter-plate. The anchoring element is preferably a nut that corresponds to the thread of the tensile element and that can enter into screw connection with the thread (male screw) arranged at the end of the tensile element.

The element providing security against rotation preferably lies on the side of the mounting plate remote from the counter-plate. The element providing security against rotation can thereby be stopped from a rotation in a particularly simple manner. The anchoring element is typically arranged rigidly by the foundation to be cast.

A thread is further preferably provided at the tensile element at its end that is close to the mounting plate and that is configured as engageable with a clamping means. It is of advantage here if the clamping means has a thread matching the thread at the end of the tensile element close to the mounting plate to clamp the tensile element between the mounting plate and the counter-plate. A nut is preferably used for this purpose that is placed onto the section of the tensile element projecting from the hollow pipe in the direction of the mounting plate so that the tensile element anchored at the counter-plate is clamped between the mounting plate and the counter-plate by a rotation of the nut in the direction of the mounting plate. It is not necessary here that the clamping means lies directly on the mounting plate. It can rather be of advantage that the clamping means is that component that is arranged closest to the end of the tensile element projecting from the mounting plate. The clamping means is preferably provided with a disk that evenly distributes the forces exerted by the clamping means.

A clamping means is furthermore advantageously also provided at the apparatus that is in engagement with the tensile element and urges the element providing security against rotation in the direction of the side of the mounting plate that is remote from the counter-plate. A clamping of the tensile element is hereby made possible in a particularly simple manner. The clamping means is preferably a nut with or without a washer that presses the element providing security against rotation in the direction of the mounting plate. The element providing security against rotation preferably comprises an inner part that is directly connected to the outer contour of the tensile element.

It is possible by a provision of a multi-member design of the element providing security against rotation to replace parts that are subject to greater wear or to a greater working strain independently of parts of the element providing security against rotation that are subject to less wear. The inner part that is connected to the outer contour of a tensile element is thus relatively low-wear, whereas the outer part of the element providing security against rotation on which a clamping means typically lies has to be replaced quite often. Overall, this produces fewer costs incurred since an independent replacement of the two parts (inner part and outer part) is possible. In addition, the production of the two mutually separate parts is less complex and/or expensive than the production of a combination part including these two parts.

In this variant, the inner part is preferably a clamping element that can be attached in a rotationally rigid manner to the outer contour of the tensile element by a clamping connection. The clamping connection can be effected by two clamping connection elements that each surround around half of a peripheral section of the tensile element and that are fastened to the tensile element by a screw connection and/or clamp connection such that a rotation of the tensile element independently of a rotation of the clamping connection can no longer be performed. The clamping connection can furthermore preferably also be designed with the aid of a screw connection by which both clamping connection elements can be moved toward one another.

The tensile element can be designed as a threaded bar here that preferably has a smaller cross-section area in its two ends than in a section connecting the two ends. Damage to the tensile element in the section provided with the larger cross-section is thereby anticipated on the exertion of a rotational movement of the tensile element or of the torsional moments resulting therefrom.

In addition, it is of advantage if the tensile element has a circular cross-section at its two ends and a cross-section area differing therefrom in a section disposed between the two ends. It is thus possible that threads are provided at both ends of the tensile element; on the one hand, screwable at an anchoring element or at the counter-plate into a counter-thread and, on the other hand, connectable to the clamping means.

The tensile element preferably has a section on the side of the mounting plate remote from the counter-plate in a state anchored to the counter-plate whose cross-section corresponds to a round hole, to a three-angled form, to a four-angled form, to a five-angled form, to a six-angled form, to a seven-angled form, to an eight-angled form, to a nine-angled form, to a ten-angled form, to an eleven-angled form or to a twelve-angled form. Each cross-section of the tensile element is furthermore advantageous that is not point-symmetrical. A placement of a correspondingly shaped passage hole of an element providing security against rotation that is rotationally rigidly fixed is here namely also able to suppress a rotation of the tensile element without any clamping connection of the tensile element and of the element providing security against rotation.

It is advantageously likewise conceivable that the mounting plate has a pin and/or a pin mount for fastening the work machine, wherein the pin and/or the pin mount projects from the side of the mounting plate remote from the counter-plate in a perpendicular manner. The pin and/or the pin mount represents connection elements with whose aid the work machine to be secured is connectable to the anchorage apparatus. It is clear to the skilled person that such pins/pin mounts can adopt many different designs without losing their basic effect.

The present invention furthermore discloses a method of anchoring a work machine to a foundation using an apparatus in accordance with one of the above-described embodiments, wherein the apparatus is preassembled completely outside the site of operation and is positioned and aligned at the site of operation before the foundation is cast.

The present invention furthermore discloses a method of dismantling an anchorage of a work machine to a foundation in which a clamping means, preferably a nut that is in engagement with a tensile element, is released, an element providing security against rotation that rotationally rigidly fixes the tensile element in an assembled state is raised and/or dismantled, and a rotational movement of the tensile element is carried out to release an anchoring connection to a counter-plate or to an anchoring element anchoring the tensile element to the counter plate.

BRIEF DESCRIPTION OF THE DRAWINGS

Further advantages and properties of the invention will be explained in more detail with reference to the embodiments shown in the Figures. There are shown.

DESCRIPTION OF THE PREFERRED EMBODIMENTS

In the following passage, different embodiments of the apparatus in accordance with the invention for anchoring a work machine to a foundation will be presented. The anchorage in an on-site concrete foundation should introduce the occurring compression forces and tensile forces into the foundation.

Figure 1:
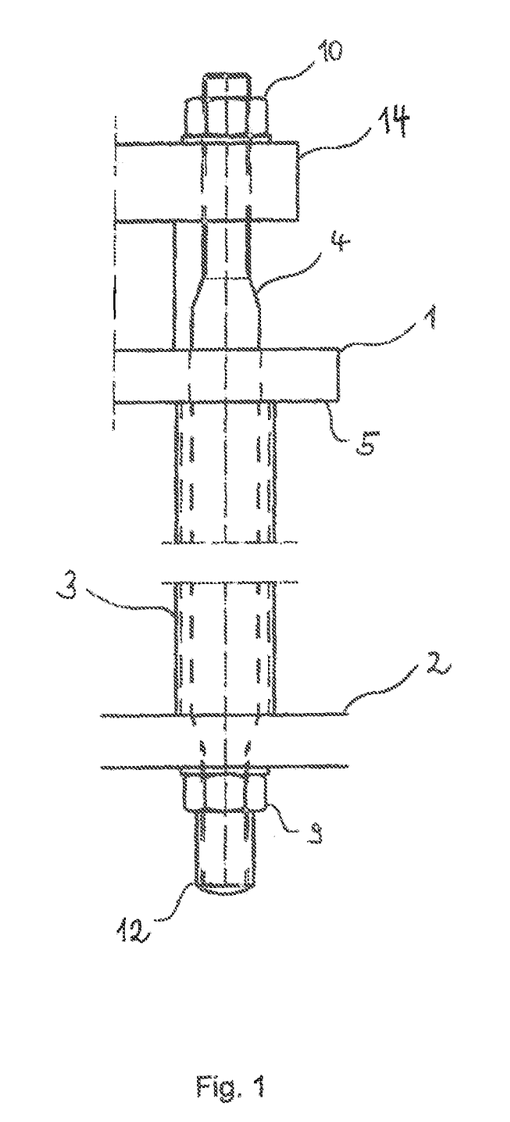
FIG. 1: a first embodiment of an apparatus in accordance with the invention in a side view.

FIG. 1 shows a side view of a first embodiment of an anchorage apparatus in accordance with the invention. The mounting plate 1 can be seen that is connected to the counter-plate 2 via a hollow pipe 3. The tensile element 4 is introduced into the hollow pipe 3 into an opening matching the hollow pipe 3. The tensile element 4 furthermore extends through an opening in the counter-plate 2 that is likewise arranged in the region of the hollow pipe 3. The tensile element 4 has, in the section at the side of the counter-plate 2 that is remote from the mounting plate 1, a thread that in an operative relationship with a nut 9 or with its internal thread. The nut 9 (anchoring element) provides that a movement of the tensile element 4 in the direction of the mounting plate 1, that is out of the opening of the counter-plate 2, is suppressed. The tensile element 4 is thereby held tight by means of the counter-plate 2 in the event of any tensile forces arising. A cap is designated by reference numeral 12 that is placed onto the end of the tensile element 4 projecting from the counter-plate 2 to prevent a connection of the tensile element 4 and the concrete on a casting procedure of a concrete foundation.

An element providing security against rotation 5 can furthermore be seen that is embodied by the mounting plate 1 in this embodiment. The element providing security against rotation 5 or the mounting plate 1, for example, has a passage hole whose cross-sectional shape corresponds to a six-angled form. The tensile element 4 furthermore also has a corresponding outer contour (a six-angled form in the example) in the section extending through the passage hole of the element providing security against rotation 5 or of the mounting plate 1 so that, on a corresponding alignment of the two components, a rotation of the tensile element 4 is precluded on a fixed-position arrangement of the element providing security against rotation 5 or of the mounting plate.

A clamping means 10 is preferably screwed onto a thread of the tensile element 4 to be able to introduce tensile forces to the element 4, with the thread being arranged close to an end section of the tensile element 4. It is thereby achieved that the tensile element 4 is clamped between the counter-plate 2 and a stabilizing plate 14. Tensile forces that can be passed on directly from the stabilizing plate 14 to the tensile element 4 via the clamping means 10 can thus be easily led off.

The stabilizing plate 14 has a round passage hole through which the tensile element 4 passes. In this respect, the tensile element 4 likewise has a circular cross-section in the region that passes through the stabilizing plate 14. The cross-section of the tensile element 4 only changes toward a six-angled form in the transition from the stabilizing plate 14 and from the mounting plate 1 or from the element providing security against rotation 5. The stabilizing plate 14 with its passage hole serves the guiding, stabilizing, and holding of the tensile element 4.

Figure 2:
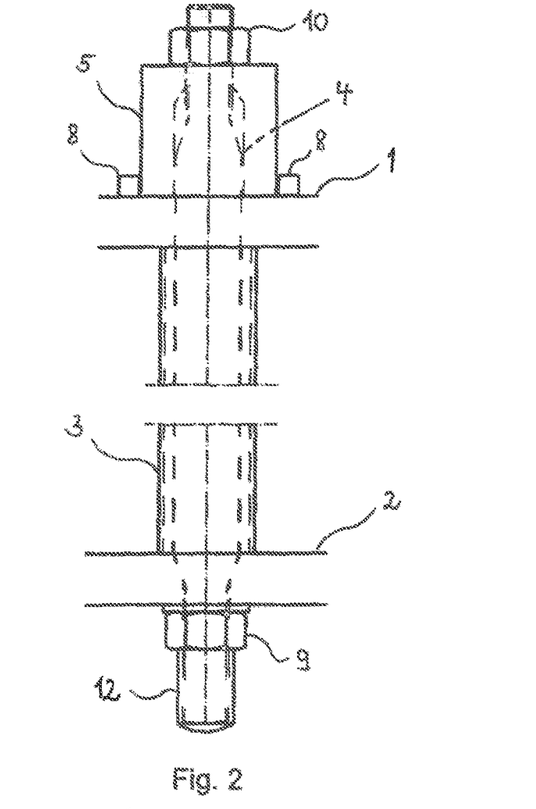
FIG. 2: a second embodiment of an anchorage apparatus in a side view.

FIG. 2 shows a second embodiment for anchoring a work machine to a foundation and in particular differs from the preceding embodiment by the different design of the element providing security against rotation. Identical reference numerals are furthermore used for identical components and will not be described again any more or no longer in full performability.

Unlike the first embodiment, the element providing security against rotation 5 now lies on the mounting plate 1 and is not embodied by the mounting plate 1. The element providing security against rotation 5 has a passage hole through which the tensile element 4 extends and has an inner cross-sectional area that substantially corresponds to the outer contour of the tensile element 4 in this region. It must, however, be noted that the element providing security against rotation 5 changes its inner cross-sectional area from circular to a six-angled form in the course toward the mounting plate 1. In addition, locking means 8 are arranged in a fixed position at the mounting plate 1 and suppress a rotation of the element providing security against rotation 5 or of the tensile element 4 in operative connection therewith. If therefore a rotational force is exerted along the longitudinal axis of the tensile element due to a force effect originating from the outside, the arrangement of element providing security against rotation 5 and locking means 8 counteracts it and prevents a rotation of the tensile element 4. An unwanted release of the tensile element 4 from the anchoring element 9 is thereby also not possible in the event of defects during the preloading procedure.

Figure 2A:
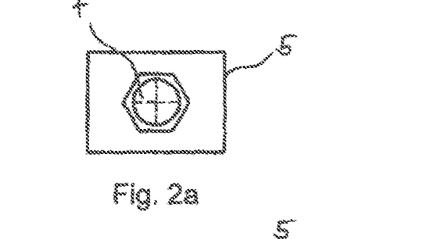
FIG. 2a: an element providing security against rotation of the second embodiment in a plan view.

FIG. 2a shows a cross-sectional view of the element providing security against rotation 5 in accordance with the second embodiment, wherein the sectional view is cut at the level of the element providing security against rotation 5 in which the tensile element 4 has a round cross-section and the element providing security against rotation 5 already has a cut-out in six-angled form. The tensile element 4 in the round section and the inner basic shape of the element providing security against rotation as a six-angled form can be recognized. It is accordingly clear that on the introduction of a tensile element 4 that has an outer shape corresponding to the passage hole, a rotation of the tensile element 4 is not possible without a rotation of the element providing security against rotation 5.

Figure 2B:
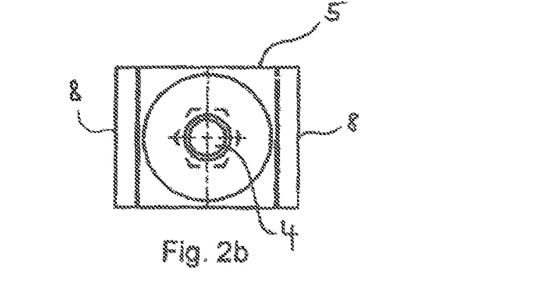
FIG. 2b: a plan view of the second embodiment of the anchorage apparatus without clamping means.

FIG. 2b shows a plan view of FIG. 2 without the associated clamping element 10 (nut). The locking means 8 in the form of abutment rails arranged at oppositely disposed sides of the element providing security against rotation 5 can be recognized. The tensile element 4 passing through the passage hole 7 can additionally be recognized.

Figure 3:
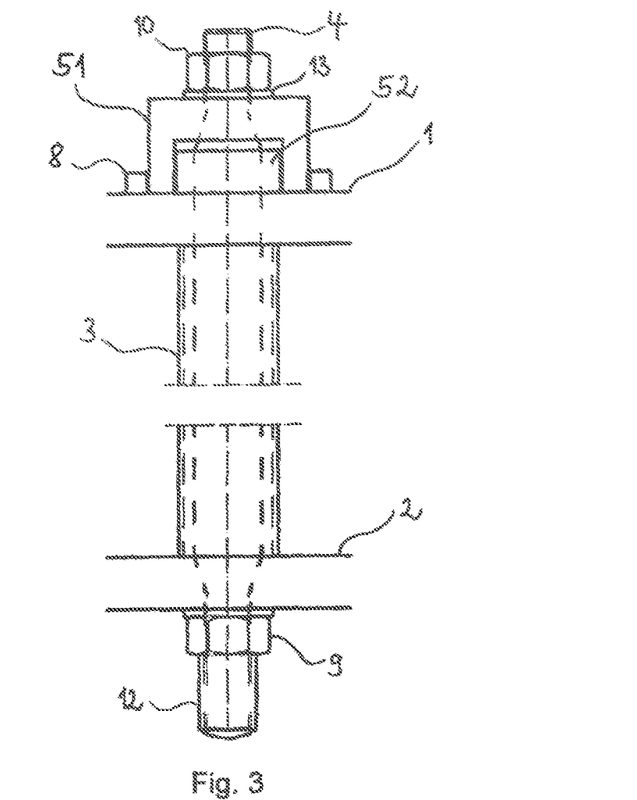
FIG. 3: a third embodiment of the anchorage apparatus in a side view.

FIG. 3 shows a third embodiment of the apparatus for anchoring a work machine to a foundation that mainly differs from the preceding embodiment in the multi-member embodiment of the element providing security against rotation 51, 52.

The element providing security against rotation 5 can be divided into two parts. An inner part 52 and an outer part 51 surrounding it. The outer part 51 adjacent to the clamping means 10 has a passage hole 7 that corresponds to a circular bore. The thread of the tensile element 4 is led through in this section.

This embodiment furthermore comprises a washer 13 that is optional for all the embodiments and that is arranged between the clamping means 10 and the element providing security against rotation 5. This has the advantage of a uniform force transmission of the clamping means 10 to the element providing security against rotation 5.

The element providing security against rotation 5 of the third embodiment comprises an inner part 52 and an outer part 51 that is adjacent to it and that has a cut-out into which the inner part 52 can be introduced.

The simple production of the individual components of the element providing security against rotation 5 is advantageous in this embodiment.

Figure 3A:
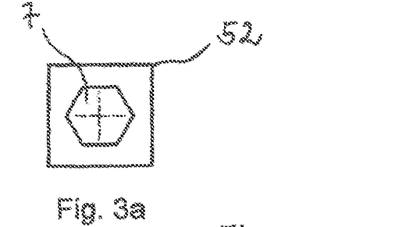
FIG. 3a: a plan view of the element providing security against rotation of the third embodiment of the anchorage apparatus.

As shown in the plan view of the inner part 52, the inner part 52 has a passage hole 7 that substantially corresponds to the outer contour of the tensile element 4. In this respect, no transition of differently shaped cross-sectional areas that is technically complex in production has to be provided in the passage hole 7. The outer part 51 can rather have a circular passage bore through which the tensile element 4 is led. The security against rotation is achieved by the inner part 52 that is in operative connection with the tensile element 4. The operative connection is transferred to the locking means 8 via the outer part 51.

Figure 3B:
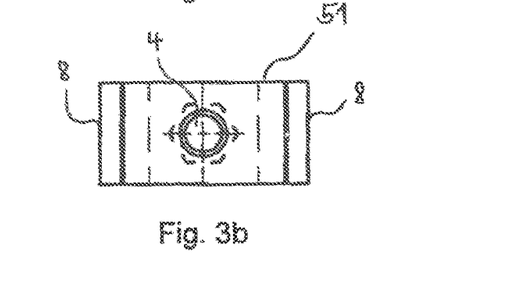
FIG. 3b: a plan view of the third embodiment of the anchorage apparatus without clamping means.

FIG. 3b shows a plan view of the third embodiment of the anchorage apparatus without clamping means 10. The tensile element 4 can be recognized that passes through the passage hole of the outer part 51 and the locking means 8 arranged at oppositely disposed sides of the outer part 51. The cut-out of the outer part 51 in which the inner part 52 is mounted is marked by dashed lines.

Figure 4:
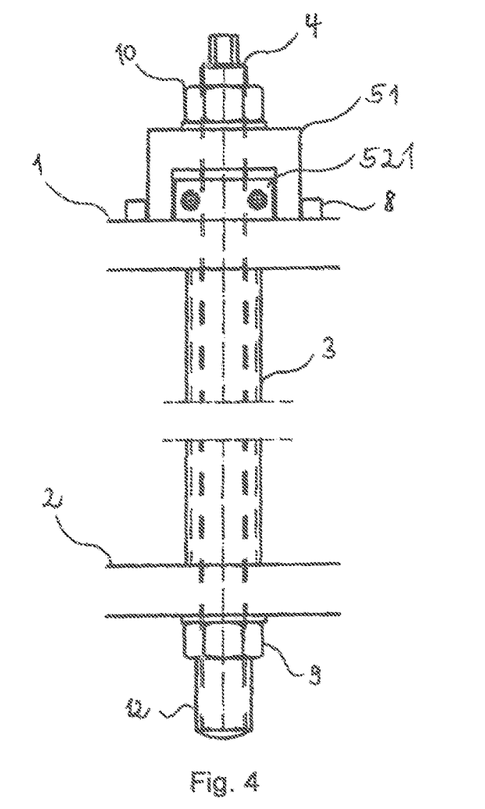
FIG. 4: a fourth embodiment of the anchorage apparatus in a side view.

FIG. 4 shows a fourth embodiment of the present invention that differs from the preceding embodiment in that the inner part 52 of the element providing security against rotation 5 is configured in two parts. In addition, the inner part 521 surrounds a region of the tensile element that is configured as circular in its cross-section. Due to the inner part 52 formed as a clamping element 521, it is nevertheless possible to establish a rotationally rigid connection of the inner part 52 to the tensile element 4. For this purpose, an element comprising two parts is placed around the tensile element and is fixed at the tensile element by clamping screws such that the clamping element 521 co-rotates on a rotation of the tensile element 4.

To facilitate a release of the tensile element 4 from the anchoring element 9, a cross-sectional shape differing from a circle is provided at the end of the tensile element 4 remote from the counter-plate 2 and, for reasons of simplicity, can be brought into engagement with a lever tool. Larger forces can then be applied for rotating the tensile element 4 or for releasing the anchoring connection to the anchoring element 9.

Figure 4A:
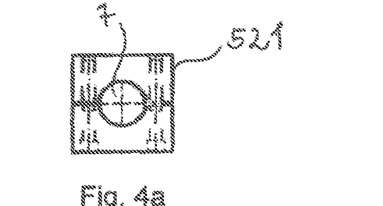
FIG. 4a: a plan view of the element providing security against rotation of the fourth embodiment.

FIG. 4*a* again shows a view of the inner part, here in the embodiment of a clamping element 521, that can be attached in a rotationally fixed manner to the tensile element 4 with the aid of two connection screws.

Figure 4B:
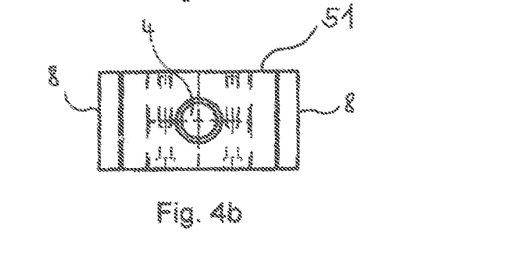
FIG. 4b: a plan view of the fourth embodiment of the anchorage apparatus without clamping means.

FIG. 4*b* shows a plan view of the embodiment of the anchorage apparatus shown in FIG. 4 without clamping means, here a nut, in which the tensile element 4, the outer element 51 of the element providing security against rotation 5, and the two locking means (abutment rails) can be seen.

Figure 5:
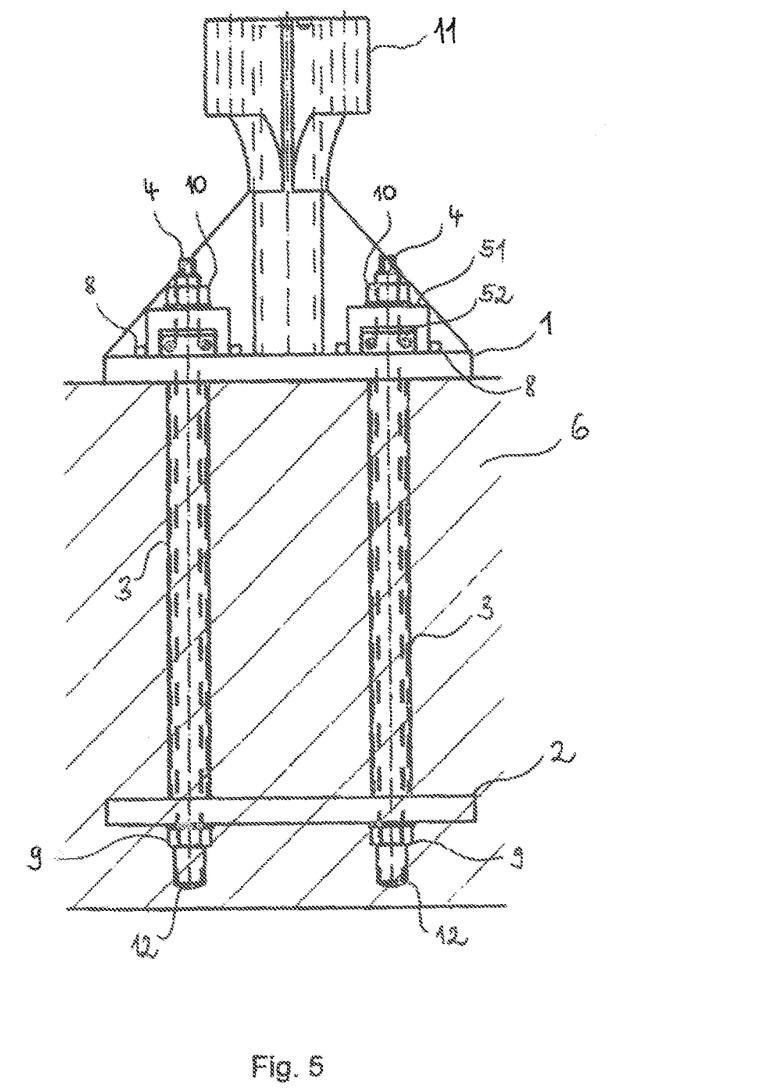
FIG. 5: an overall representation of the anchoring principle with the fourth embodiment with reference to a side view.

FIG. 5 shows an overall representation of the anchorage principle with reference to the above-described fourth embodiment of the anchorage apparatus. It can be recognized that the mounting plate 1 lies on a foundation 6 and the hollow pipe 3 as well as the counter-plate 2 and the anchorage element 9 are surrounded by the foundation. If now tensile forces are applied, that is forces that pull the mounting plate 1 out of the foundation 6, said forces are particularly effectively introduced into the foundation by the anchorage apparatus.

Pin mounts 11 that are molded to the mounting plate 1 and that are used to connect to a work machine can additionally be recognized.

In a method for anchoring a work machine to a foundation, the apparatus is preassembled outside the site of operation and is positioned and aligned at the site of operation before the foundation 6 is cast.

On a dismantling of the anchorage, the clamping means 10 that clamps the tensile element 4 to the counter-plate 2 has to be released, all the components placed onto the tensile element 4 such as the element providing security against rotation 5, that can also be designed in multiple parts, have to be removed from the tensile element and, in a next workstep, the mounting plate has to be lifted off the foundation. In addition, the tensile element can be released from the anchoring means 9 by carrying out a rotational movement and can be used again on a repeated setup of an anchorage apparatus.

Figure 6:
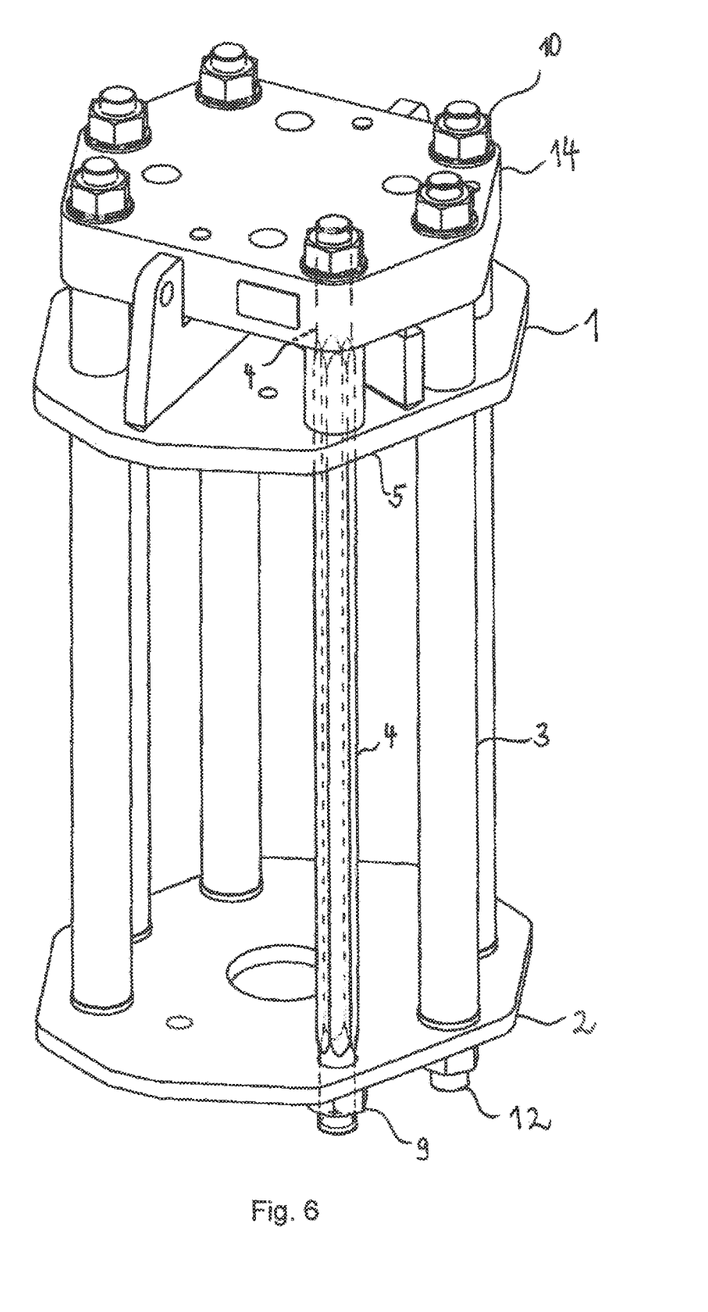
FIG. 6: an oblique view of the apparatus in accordance with the invention.
Figure 7:
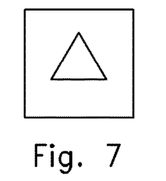
FIG. 7-15 plan views of alternative embodiments of the element providing security against rotation with holes of different cross-section therethrough.
Figure 8:
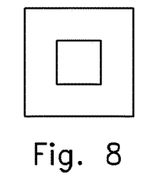
Figure 9:
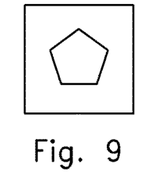
Figure 10:
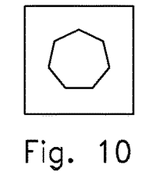
Figure 11:
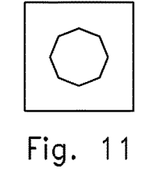
Figure 12:
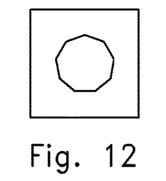
Figure 13:
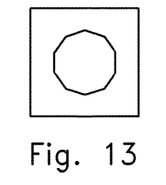
Figure 14:
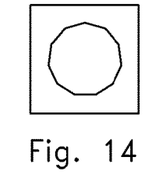
Figure 15:
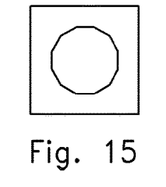

FIG. 6 shows an oblique view of the anchorage in accordance with the invention in which large points of coincidence with the first embodiment are present. In this Figure, a plurality of the apparatus in accordance with the invention are shown that together serve to anchor a work machine to a foundation. The tensile element 4 can be recognized that has a section that substantially corresponds to a six-angled form. In addition, the tensile element 4 has a section having a circular cross-section. The element providing security against rotation 5 is embodied by the mounting plate 1 and has a passage hole that has an inner cross-sectional shape that suppresses a rotation of the tensile element 4 configured as a six-angled form. The counter-plate 2 and the anchoring element 9 in operative connection with the tensile element 4 can additionally be recognized. The cap 12 serves as protection from a flowing in of concrete. The stabilizing plate 14 with its passage hole serves the guiding, stabilizing, and holding of the tensile element 4. The hollow pipe 3 connects the mounting plate 1 and the counter-plate 2. The hollow pipe 3 is not shown in part for a better understanding. The cross-sectional shape of the tensile element 4 can thereby be better recognized.

The invention claimed is:

1. An apparatus for anchoring a work machine to a foundation (6) comprising:
    a mounting plate (1) for placing on a foundation (6);
    a counter-plate (2) for casting in the foundation (6);
    a hollow pipe (3) that connects the mounting plate (1) to the counter-plate (2), with an interior of the hollow pipe (3) accessible from the side of the mounting plate (1) remote from the counter-plate (2) and the hollow pipe (3) contacting facing surfaces of the mounting plate (1) and counter-plate (2) but not extending through said plates (1,2);
    a tensile element (4) for introduction into the hollow pipe (3), wherein
    the tensile element (4) directly contacts the mounting plate (1) and counter-plate (2) and is releasably anchorable to the counter-plate (2) by a rotational movement,
    an element preventing rotation (5) is connected to an outer contour of the tensile element (4) and secures the tensile element (4) in a rotationally fixed manner, and
    the tensile element (4) is removable and extractable from both said plates (1, 2) after the foundation (6) is cast.

2. An apparatus in accordance with claim 1, wherein the element preventing rotation (5) is arranged at a side of the mounting plate (1) remote from the counter-plate (2) or is formed by the mounting plate (1).

3. An apparatus in accordance with claim 1, wherein the element providing security against rotation (5) comprises a passage hole (7) whose inner cross-section corresponds to an outer cross-section of the tensile element (4).

4. An apparatus in accordance with claim 1, further comprising a locking means (8) that is arranged in a fixed position at the side of the mounting plate (1) remote from the counter-plate (2) for a rotationally rigid fixing of the element providing security against rotation (5), with the locking means (8) preferably being an abutment rail.

5. An apparatus in accordance with claim 1, wherein the tensile element (4) has a thread at an end close to the counter-plate (2), said thread being connectable by a rotational movement to the counter-plate (2) itself and/or to an anchoring element (9) that is arranged at a side of the counter-plate (2) remote from the mounting plate (1).

6. An apparatus in accordance with claim 1, wherein the element providing security against rotation (5) lies on the side of the mounting plate (1) remote from the counter-plate (2).

7. An apparatus in accordance with claim 1, wherein the tensile element (4) has a thread at an end close to the mounting plate (1), said thread being formed as engageable to clamping means (10).

8. An apparatus in accordance with claim 1, further comprising clamping means (10) in engagement with the tensile element (4) and providing security against rotation (5) in a direction of a side of the mounting plate (1) remote from the counter-plate (2).

9. An apparatus in accordance with claim 1, wherein the element providing security against rotation (5) comprises an inner part (52) that is directly connected to the outer contour of the tensile element (4) and comprises an outer part (51) adjacent to the inner part (52).

10. An apparatus in accordance with claim 9, wherein the inner part (52) that is directly connected to the outer contour of the tensile element (4) is a clamping element (521) that can be rotationally rigidly attached to the outer contour of the tensile element (4) by a clamp connection.

11. An apparatus in accordance with claim 1, wherein the tensile element (4) is a threaded bar.

12. An apparatus in accordance with claim 1, wherein the tensile element (4) has a section at a side of the mounting plate (1) remote from the counter-plate (2) in a state anchored to the counter-plate (2), and having a cross-section corresponding to one of a circle, a triangle, a square, a pentagon, a hexagon, a septagon, an octagon, a nonagon, a decagon, an undecagon or a dodecagon.

13. An apparatus in accordance with claim 1, wherein the mounting plate (1) has a pin and/or a pin mount (11) for fastening the work machine, wherein the pin and/or the pin mount (11) projects perpendicular from the side of the mounting plate (1) remote from the counter-plate (2).

14. An apparatus in accordance with claim 3, wherein the inner cross-section of the passage hole (7) corresponds to one of a circle, a triangle, a square, a pentagon, a hexagon, a septagon, an octagon, a nonagon, a decagon, an undecagon or a dodecagon.

15. An apparatus in accordance with claim 8, wherein the clamping means (10) is a nut.

16. An apparatus in accordance with claim 11, wherein the threaded bar has a smaller cross-sectional area at two opposite ends than in a section connecting the two ends.

17. An apparatus in accordance with claim 1, additionally comprising a cap (12) for placement onto an end of the tensile element (4) projecting from the counter-plate (2).

18. A method of anchoring a work machine to a foundation (6) having an apparatus in accordance with claim 1, wherein the apparatus is preassembled completely outside a site of operation and is positioned and aligned at the site of operation before a foundation (6) is cast.

19. A method of dismantling an anchorage of a work machine to a foundation (6) comprising:
releasing clamping means (10) in engagement with a tensile element (4);
lifting and/or dismantling an element preventing rotation (5) that rotationally rigidly fixes the tensile element (4) in an assembled state; and
carrying out a rotational movement of the tensile element (4) to release an anchoring connection to a counter-plate (2) or to an anchoring element (9) anchoring the tensile element (4) to the counter-plate (2),
and with the tensile element (4) directly contacting both a mounting plate (1) and the counter-plate (2) in the anchoring connection.

20. The method in accordance with claim 19, wherein the clamping means (10) is a nut.

* * * * *